R. B. FAGEOL.
AUTOMOBILE BUMPER.
APPLICATION FILED JUNE 6, 1910. RENEWED NOV. 21, 1913.
1,202,690.  Patented Oct. 24, 1916.
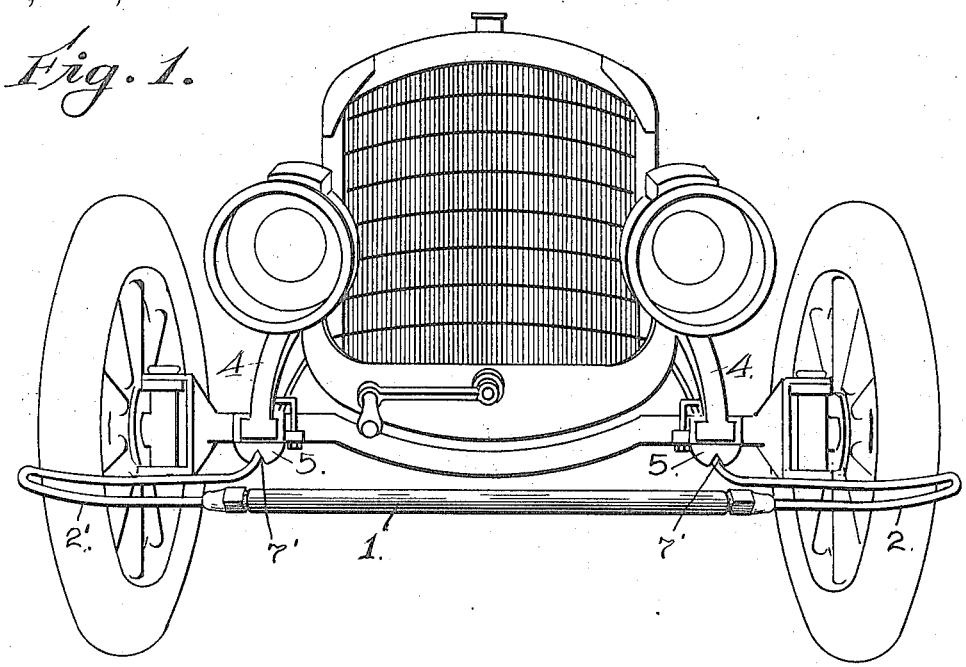
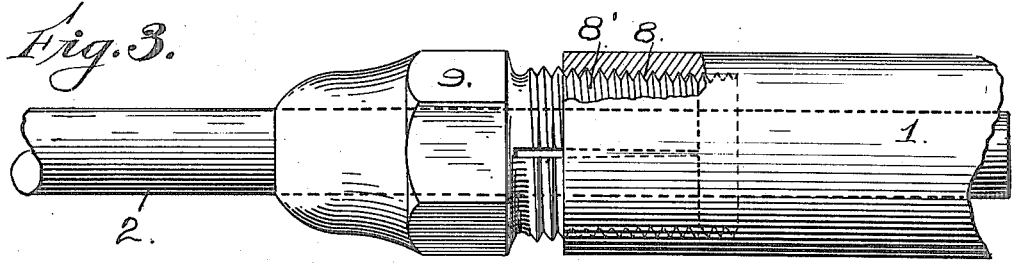
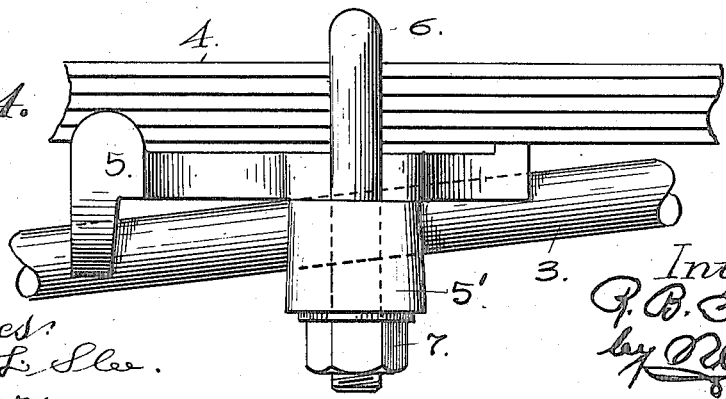

UNITED STATES PATENT OFFICE.

ROLLIE B. FAGEOL, OF OAKLAND, CALIFORNIA.

AUTOMOBILE-BUMPER.

1,202,690.  Specification of Letters Patent.  Patented Oct. 24, 1916.

Application filed June 6, 1910, Serial No. 565,154. Renewed November 21, 1913. Serial No. 802,325.

*To all whom it may concern:*

Be it known that I, ROLLIE BELLE FAGEOL, a citizen of the United States, residing at Oakland, in the county of Alameda, State of California, have invented certain new and useful Improvements in Automobile-Bumpers, of which the following is a full, clear, and exact description.

The present invention relates generally to improvements in means for protecting vehicles against damage resulting from collisions with moving or stationary objects and is particularly directed to a bumper for automobiles.

One object of the present invention is to provide a device of the aforesaid character which may be cheaply manufactured and readily attached to a vehicle without altering the construction or detracting from the appearance thereof, and which when positioned will effectively guard against injury the parts of a vehicle which it is designed to protect.

My invention is further directed to the provision of a bumper for vehicles which will embody the fewest possible number of parts and which by reason of its structure and mode of application to a vehicle, will eliminate the rattling noise which usually results from the interconnected parts of many of the bumpers now known. The elimination of this disagreeable feature is a decided advantage for obvious reasons.

My invention further contemplates the provision of a bumper for motor vehicles and the like of such nature as to be particularly effective in deflecting the shocks from encountering obstacles in such a way as to minimize the danger of injury either to the vehicle or to the object encountered.

A further object of my invention is the provision of a bumper which will yield in all directions both forward and back and laterally, and more particularly in which the end portions of the bumper will yield to a considerable extent, whereby the force of impact or blow received from the bumper from any angle, and particularly upon the end portions thereof which are exposed and most likely to be struck, will be dissipated through the resiliency of the bumper, and the car, as well as any object struck, most effectively protected against injury.

Another object of the invention consists in the provision of a bumper structure of such character that the bumper itself will not be destroyed or permanently distorted or injured by the less important shocks to which a bumper is frequently subjected, so that the bumper will not be quickly rendered useless or distorted into unsightly form.

A further object of the invention is the construction of a bumper in such a way that it may be adjusted to render it capable of being attached to cars of various types and sizes and having different widths of frame.

Another object of the invention is the provision of a bumper structure which will be attractive in appearance, as well as efficient and durable, and which shall tend to improve the appearance of the vehicle to which it is applied.

I shall now proceed to describe my invention with reference to the accompanying drawings, wherein I have shown a specific embodiment of my invention as applied to the forward part of a motor vehicle, although I would have it understood that I do not limit myself to this particular form of use, or method of application, as my invention may be applied to the rear or other part of a motor vehicle or to any other form of vehicle, and the structural details thereof may be varied in different ways without departing from the spirit and scope of my invention.

In the drawings: Figure 1 is a perspective view illustrating one form of my bumper applied to an automobile. Fig. 2 is a plan view of the bumper as shown in Fig. 1 removed from the machine. Fig. 3 is an enlarged detail broken view of the body member or buffer bar of the bumper, disclosing an adjustable connection between the same and one of its yieldable supporting members. Fig. 4 is a detail broken view disclosing one form of adjustable connection between the yieldable supports and the forward end portion of a vehicle.

Referring now in detail to the specific embodiment of my invention shown in the drawings, in which like characters of reference are employed to designate similar parts throughout the several views, numeral 1 is used to indicate the body member of the bumper bar, and 2 and 2′ the end supporting members therefor. These members are preferably made of yieldable material such as spring metal and are designed, when the bumper is applied transversely of the automobile, to project a slight distance beyond the sides of the body of the vehicle, or substantially in line with the tread of the forward wheels thereof.

Each end supporting member 2 and 2' is preferably curved inwardly and rearwardly, as shown, so as to form a goose-neck extension member for the bumper bar or body 1, the rearwardly extending portions 3 of the said members being, in the present drawing illustrated as adjustably attached to the forward springs 4 of the automobile by the grooved clamp plates 5—5', between which the said portion 3 of each supporting member is secured, and held to the spring 4 of the automobile by the stirrup bolt 6, which embraces the leaves of the lower half of the spring 4 and the plate 5, the screw threaded ends of the bolt passing through the clamp plate 5', and being held thereto by the securing nuts 7. The rearwardly extending portion 3 of each yieldable supporting member rests within the longitudinal recesses 7' of the clamp plates 5 and 5', which recesses, when the plates are clamped together, form a longitudinally disposed seat for said free ends 3 of the supporting members 2 and 2'. By adjusting the ends 3 of the supporting members relative to the clamp plates 5 and 5', the position of the body portion 1 of the bumper attachment may be readily varied in relation to the forward end of the automobile. This adjustment is accomplished by simply unscrewing the nuts 7 to release the clamp plates 5 and 5', when the ends 3 may be moved inwardly or outwardly as desired, to decrease or increase the distance of the body 1 with respect to the front of the machine. By this arrangement it will be manifest that my invention may be readily applied to automobiles of various types and positioned relatively to the parts thereof to be protected to form an efficient guard.

In the particular embodiment of my invention illustrated, the body 1 is composed of a hollow bar, the ends of which are formed with the tapered internal screw-threads 8, which receive the externally screw-threaded split extensions 8' of the hollow securing nuts 9. Within these securing nuts, the supporting members 2 and 2' are adjustably held, being clamped therein by screwing the split extensions 8' into the tapered threaded ends of the body 1, the said securing nuts serving as bearings for the supporting members 2 and 2'. By this method of connecting the end supporting members to the body portion or bar of the bumper, the supporting members may be adjusted inwardly and outwardly to vary the width of the bumper and attaching means to adjust the device to cars of different widths of frame. Thus, the bumper attachment is not only permitted longitudinal adjustment with respect to the car front, but likewise lateral adjustment to vary the width thereof in accordance with that of the car to which it is to be applied.

Inasmuch as each of the supporting yieldable end members constitutes a continuation of the bar or body member 1, a continuous surface is provided which eliminates the possibility of the ends of the buffer bar becoming entangled with an object interposed in the path of movement of the vehicle and which would ordinarily tend to foul the bumper and break the projecting ends. Furthermore, the configuration of the bumper is such that obstructions with which it comes in contact are generally cast or pushed to one side. The latter result is promoted particularly by the rearward curvature of the end portions of the bumper, which are also yielding, so that if the bumper receives an impact at one side of the center thereof that side of the bumper will yield and that the inclination thus produced in addition to the initial end curvature will guide the object laterally and rearwardly out of the path of travel of the car. This result is further promoted by forming the bumper ends of smooth metal spring bars which cause the blows to glance off in a manner which would not be so satisfactorily obtained if the front of the bumper were, for instance, formed of rubber tubing or the like.

As the body of the bumper is supported and sustained by its spring end members, it is apparent that the same will give to any lateral strains placed thereon equally as well as to longitudinal strains; consequently the bumper will yield under all strains to which it is subjected. By thus compensating for lateral strains, there is no danger of the connection between the bumper body and the car body being broken or damaged by a side blow falling thereon. Furthermore, owing to the yielding character of the bumper and particularly the end portions thereof, it will be seen that when the bumper is subjected to even considerable shocks, it will yield without being broken or permanently damaged. The end portions of the bumper are particularly likely to be struck glancing or other blows and these portions being of spring material will at once return to their original shape without any permanent injury being caused to the bumper whatever.

It will be seen that the bumper described includes an impact receiving member comprising the body portion 1 of the bumper and the outward extending sections of the spring end portions of the spring support 2 and 2', which comprise in fact extensions of the body 1 and that this impact receiving member is formed, as to its end portions at least, of spring metal, that is, metal which will yield to a substantial extent and return to its original shape. The end portions of this impact receiving member are also reinforced and yieldingly supported by the inwardly bent parts of the spring supporting members, which assist in restoring the bumper to its original position after impact. The use of spring material in the construction of the bumper itself is of particular importance in securing durability and ability to withstand impacts without permanent distortion, thereby overcoming a defect to which bumpers made of rigid material have been peculiarly subjected.

An important feature of the present invention resides in providing the body of the bumper with spring supporting members which constitute a continuation of the body and the supporting means therefor, and this irrespective of the shape which may be given thereto, whereby spring held supporting rods and the attaching parts associated therewith are unnecessary, and this feature it is desired to claim broadly.

Having thus described my invention what I claim as new herein and desire to secure by Letters Patent is:

1. An automobile bumper comprising a body member for extension across the front of an automobile, a plurality of spring supporting members laterally extended with respect to the body of the automobile from the ends of the body part and means for adjustably clamping the spring supporting members to the frame of an automobile.

2. An automobile bumper comprising a buffer bar for extension across the front of an automobile, yieldable supporting members longitudinally extended from the ends of said body member, adjustable means for clamping said members to the body member for lateral adjustment, and means for clamping the free end of the spring supporting members to the frame of an automobile.

3. An automobile bumper, comprising a buffer bar for extension transversely of an automobile, yieldable supporting members adjustably connected to each end of said bar for lateral adjustment, and adjustable means for clamping the free end of said supporting members to the frame of an automobile, whereby the bumper is permitted lateral adjustment and horizontal adjustment relative to the automobile.

4. An automobile bumper comprising a tubular body member, projecting spring supports extending within the ends of the body member, an adjusting nut member on the end of each spring support for securing the spring supports and the body member together, one of the members being provided with an externally screw threaded split end portion and the other of said members with an internally screw threaded portion.

5. An automobile bumper comprising a buffer bar provided with spring supporting members of goose-neck form extended from the ends thereof, and means for clamping the free ends of said supporting members to the frame of an automobile.

6. A bumper for vehicles comprising a buffer bar for extension transversely of the vehicle, spring supporting members for said bar, the said supporting members constituting a continuation of the body member and being extended therefrom laterally relative to the vehicle.

7. An automobile bumper, comprising a body member for extension transversely of an automobile, adjustable spring supporting members secured to and projecting from each end of the body member, the said supporting members constituting longitudinal continuations of the body member.

8. An automobile bumper, comprising a body member for extension across the front of an automobile, a spring supporting member projecting from each end of the body member, each supporting member being inwardly extended for a distance in a plane substantially parallel to the body member, and then extended horizontally at substantially a right angle to said body member, and means for clamping the free end of each supporting member to the frame of an automobile.

9. An automobile bumper, for extension completely across the front of an automobile, said bumper comprising a body member spring supporting members extending from the ends of the body member, means for clamping one end of each supporting member to an end of the said body member, and devices for clamping the opposite end of the supporting members to the frame of an automobile.

10. An automobile bumper, comprising a body member provided with tapered internally screw-threaded end sections, hollow securing nuts formed with a split externally screw-threaded section for screwing into the ends of the body member, and spring supporting members clamped to the ends of the body member by the said securing nuts.

11. A securing attachment for adjustably uniting a spring supporting member to the end of an internally threaded body member of an automobile bumper, comprising a hollow nut provided with an externally threaded split extension which screws into the threaded end of the body member, the said securing nut serving as a bearing for the spring supporting member.

12. A bumper for extension across the frame of an automobile, terminating in a loop at each end and a straight portion arranged substantially at right angles to the transverse portion of the bumper and loop for connecting each loop to the vehicle, said loops and straight portions being yieldable.

13. A bumper having an impact member adapted to extend across the front of a vehicle, said member having rearwardly curved spring end loops constituting longitudinal extensions of said impact member and adapted to yield bodily to impacts.

14. A bumper adapted to extend across the front of a vehicle and having rearwardly curved end portions constituting longitudinal extensions of the bumper and comprising front and rear spring members united at their outer extremities and yieldable means connecting the rear spring members to the vehicle.

15. A bumper for motor vehicles comprising an impact receiving part and terminal loop portions, one arm of the loop portions constituting a longitudinal prolongation of the impact receiving part, and the opposite arm of the loop portions being disposed rearwardly of and extending inwardly along-side the impact receiving portion a substantial distance from the end of the bumper and adapted at its inner end for connection with the vehicle.

16. A bumper of the character described for motor vehicles comprising an intermediate impact receiving member, and double-arm spring supporting members constituting longitudinal continuations of the impact receiving member.

17. A bumper of the character described for motor vehicles comprising an impact receiving portion formed in part at least of yieldable spring metal, and means for connecting the same to the vehicle comprising spring arms connected to the impact receiving portion and having a part extending rearwardly substantially transverse to the longitudinal axis of the impact receiving portion and adapted to be connected to the vehicle at points removed inwardly from the ends of the bumper.

18. A bumper of the type described for motor vehicles, comprising an impact portion having yieldable end portions each formed of closely related oppositely disposed arms constituting reinforced longitudinal continuations of the impact portion, and securing terminal parts located inwardly a substantial distance from the outer ends of said continuations.

19. An automobile bumper comprising open ended loops extending outwardly at the opposite ends of the bumper, and an impact receiving portion forming a continuation of said loops and spacing them apart, said loops being horizontally yieldable, and rearwardly extending attaching means on the loops to mount said bumper on the vehicle frame.

20. A bumper for motor vehicles having end portions provided with return parts to form terminal loops, the opposite arms of the loops extending substantially parallel with one another and being freely yieldable, and said return parts having terminal attaching portions at points spaced inwardly from the ends of the bumper.

In testimony whereof I have signed my name to this specification in the presence of two subscribing witnesses.

ROLLIE B. FAGEOL.

Witnesses:
N. A. ACKER,
D. B. RICHARDS.